United States Patent
Cheng et al.

(10) Patent No.: US 7,315,239 B2
(45) Date of Patent: Jan. 1, 2008

(54) INTER-VEHICLE COMMUNICATION AND WARNING APPARATUS

(75) Inventors: Yong-Hua Cheng, KaoShiung (TW); Yun-Yen Chen, KaoShiung (TW); Chung-Shun Yang, Taipei (TW); Sheng-Yung Chen, Chang-Hua (TW)

(73) Assignee: Industrial Technology Research Institute, Hsinchu (TW)

( * ) Notice: Subject to any disclaimer, the term of this patent is extended or adjusted under 35 U.S.C. 154(b) by 246 days.

(21) Appl. No.: 11/296,625

(22) Filed: Dec. 7, 2005

(65) Prior Publication Data

US 2007/0096885 A1 May 3, 2007

(30) Foreign Application Priority Data

Nov. 3, 2005 (TW) .............................. 94138576 A

(51) Int. Cl.
*B60Q 1/00* (2006.01)
(52) U.S. Cl. .................... 340/436; 340/903; 340/942; 701/96; 701/301
(58) Field of Classification Search ................ 340/436, 340/903, 902, 439, 901, 904, 942, 935, 988; 701/96, 23, 117, 301, 93
See application file for complete search history.

(56) References Cited

U.S. PATENT DOCUMENTS

| 5,087,918 | A * | 2/1992 | May et al. ..................... 342/85 |
| 5,126,735 | A | 6/1992 | Trevijano .................... 340/902 |
| 5,366,183 | A | 11/1994 | Gill ............................. 246/28 |
| 6,032,097 | A * | 2/2000 | Iihoshi et al. ................. 701/96 |
| 6,625,540 | B2 | 9/2003 | Kageyama ................... 701/301 |
| 6,681,157 | B2 | 1/2004 | Kageyama ...................... 701/1 |
| 6,707,378 | B2 | 3/2004 | MacNeille et al. ......... 340/435 |
| 6,765,495 | B1 * | 7/2004 | Dunning et al. ............ 340/903 |
| 7,162,369 | B2 * | 1/2007 | Thorne ....................... 701/301 |
| 2003/0102997 | A1 * | 6/2003 | Levin et al. .................. 342/57 |

FOREIGN PATENT DOCUMENTS

JP    P2005-227978    8/2005

OTHER PUBLICATIONS

Masatoshi Uchida Yasuo Kagawa Akihiro Okuno Technical Research Center(Yokohama) Mazda Motor Corporation 1994 IEEE p. 169-174.

* cited by examiner

*Primary Examiner*—Benjamin C. Lee
*Assistant Examiner*—Daniel Previl

(57) ABSTRACT

A short-range inter-vehicle communication and warning apparatus comprises a forward radar and a backward radar. The apparatus uses the radars to generate Frequency Modulation/Continuous Wave (FMCW) signals, uses amplitude shift keying for data modulation and arranges a special packet format, to realize such a low cost and fast response device of collision avoidance for vehicles. The invention has the dual capabilities of detecting and communicating simultaneously. It can also measure the relative speed of a preceding/rear vehicles and the relative inter-vehicle distance. The invention also exchanges the real-time traffic information with the preceding/rear vehicles at the same time. It is applicable to a one-to-one or one-to-many inter-vehicle channel model.

15 Claims, 7 Drawing Sheets

| design consideration / radar type | functions | same features | | different features | | advantages | |
|---|---|---|---|---|---|---|---|
| | | dual model radar | applicable field | radar modulation | communication modulation | makes the synchronization difficult | short-range sensitivity |
| spread spectrum radar (conventional) | 1. radar distance detection 2. inter-vehicle communication | full duplex | vehicle collision avoidance | spread spectrum | PSK modulation | yes | poor |
| present invention | 1. radar distance and velocity detection 2. inter-vehicle communication | full duplex | vehicle collision avoidance | FMCW modulation | ASK modulation | no | better |

FIG. 7

INTER-VEHICLE COMMUNICATION AND WARNING APPARATUS

FIELD OF THE INVENTION

The present invention generally relates to an inter-vehicle communication systems, and more specifically to an inter-vehicle communication and warning apparatus.

BACKGROUND OF THE INVENTION

Automotive telematics has been considered the third generation of high-tech evolution in the automobile industry. The first generation of the automotive technology evolution was guided by the high compression ratio power; the second generation of the automotive manufacturing improvement was driven by the advancement of the microelectronics control technology; the current trend of automotive evolution is considered to be governed by the "connectivity." The "connectivity" emphasizes a vehicle's ability, while in operation, to exchange the information with its environments. Examples include the availability of the live, valid and accurate mapping/routing and traffic information for driving security aid and safety aid, as well as the availability of entertainments and mobile internet for better user convenience and services. Although the Dedicated Short Range Communication (DSRC) standard has currently been adopted worldwide for the short range wireless communication development in most automotive electronics system, according to the US regulation published in October 2004, however, automotive manufactures and service vendors are allowed to use the other medias to provide short-range communication and warning system and the associated services.

Recently, collision avoidance and warning systems have gained their worldwide attention in automotive communication research and development projects for traffic safety enhancement. The current widely adopted technologies for enhancing automotive communication systems can be categorized into two major areas; the technologies for short-range information detecting and sharing for better inter-vehicle supporting, as well as technologies for global environmental information reporting for traffic safety enhancement.

The most commonly used technology for the short-range information detecting/sharing system is the development of Collision Avoidance Radars, which targets on compensating drivers' blind spots. Video cameras equipped in some vehicle models are also used for aiding drivers' generally lacking of timely critical response to the sudden change of the surrounding traffic conditions and also compensating drivers' blind spots to aid drivers take appropriate timely actions to minimize the risk of collision. The drawback of a short-range detecting and informing system includes its range limit of 200 meters, not being able to penetrate barrier objects like the preceding vehicles, and also cannot detect the surrounding traffic condition at corners. As a result, the collision avoidance effect cannot take place while vehicles are moving in high speed or under hazardous circumstances due to drivers' blind spots. From the boom marketing's perspective, exploring the existing systems to provide drivers sufficient information on surrounding environment should gain its major role in the technology development arena.

The current development of the global environmental condition reporting technologies, on the other hand, is based on the imaging telecommunication systems. With global-range traffic condition broadcasting to inform drivers of live, up to date and correct information for the surrounding traffic condition as well as the planned driving routing information. With the radio broadcasting system, the information provided by the existing systems is lacking of real-time and detailed oriented micro perspective, which, however, is extremely important for a short-rang information system to efficiently response to a time-critical condition by providing reliable live data for the immediate forward and backward traffic conditions. Since for accident prevention, the cost for data transformation and services is too high, the existing system is still mainly for global traffic improvement.

An existing inter-vehicle communication technology with the addition of automotive collision avoidance radar is mainly a vehicle-to-vehicle communication and ranging system based on spread spectrum technique.

This inter-vehicle communication system includes a spread spectrum forwarding radar installed on the front end of the vehicle, and a receiver/transmitter installed on the rear end of the vehicle. The forwarding radar is for collecting the relative distance of the preceding vehicle and passively performing the inter-vehicle communication with the preceding vehicle. The rear end receiver/transmitter does not have the radar detecting capability and cannot send out passive communication signals. The rear end receiver/transmitter, however, can receive the radar signal from the rear vehicle and perform half duplex inter-vehicle communication.

The aforementioned technique for inter-vehicle communication system using a distance detecting radar is detailed as follows.

Using radar for distance detecting: taking the forward radar as an example, the radar transmitter emits forward spread spectrum code signals to the preceding vehicle. The reflected signal from the preceding vehicle then feeds back into the forward radar. Using the known relationship between the emitting and returned signal spread spectrum codes as well as the delay time of the returned signal, the signal processing module on the radar can accurately calculate the distance of the host vehicle relative to the preceding vehicle.

Inter-vehicle communication: The spread spectrum inter-vehicle communication uses half duplex mechanism. With phase shift keying (PSK) modulation, the forward radar on the host vehicle digitizes and modulates the traffic information message into the spread spectrum radar signals and synchronously sends them out via the forward radar transmitter. The rear end of the preceding vehicle is also equipped a compatible receiver to detect the radar signal and synchronously perform demodulation and de-spread-spectrum signal to decipher the traffic information the host vehicle tries to convey. Not having the ability to issue passive transmission signals, the receiver on the rear end of the preceding vehicle modulates again the received message back into the received radar signal and reflects the signal back into the host vehicle to complete the half duplex inter-vehicle communication mechanism.

The pros and cons of this conventional spread spectrum based inter-vehicle communication system are as follows. A forward spread spectrum radar sends out the signals, which are digitized data via spectrum spread process. The reflected signals from the preceding vehicle are then fed back into the receiver of the host forward radar. With both spread spectrum code association analysis and synchronous demodulation mechanism, the dual functions of information detection and information transmission/exchange for vehicle collision avoidance can thus be accomplished. This approach has advantage of efficient interference suppression. The drawback, however, of this approach is that the synchronization mechanism is hard to achieve. Without complete spread spectrum signal synchronization, both of the aforementioned function goals are in vain.

Currently, the plan for the research and development projects for automotive warning and communication technology is to establish the vehicle-to-vehicle mobile networking, so that a vehicle can retain the operation safety even in disadvantageous conditions like heavy fogged, icy road, or even in traffic accidents. Vehicles in the future are to be equipped with wireless communication accessories, which enable each vehicle to perfume all functions of transmitting, receiving and mediating the warning messages. For example, the first vehicle, which detects a dangerous road condition, can transmit a warning message to the surrounding vehicles. Any vehicle which receives the warning message can then mediate the message and transmit and propagate the warning to a wider range.

SUMMARY OF THE INVENTION

To enhance traffic transportation safety and respond to the current trend of research and development for automotive radio communication and warning technology, the present invention provides an inter-vehicle communication and warning apparatus. The apparatus of the present invention offers the dual functions of detecting and communicating messages. In other words, the present invention not only detects the relative speed and distance of the preceding and rear vehicles, but also exchanges real-time traffic information with the preceding and rear vehicles. The present invention is mainly applied for an inter-vehicle collision warning and avoidance system.

The apparatus of the present invention includes a forward radar and a backward radar, which can be mounted on the front end, rear end, or top of a vehicle, etc. Using the frequency modulated continuous wave (FMCW) radar signals and an arranged package format, the host vehicle utilizes the amplitude shift keying (ASK) to modulate and package the digitized data with traffic information into the FMCW radar signals and synchronously transmit out the signal with the forward radar emitter. After receiving the radar signal, the backward radar of the preceding vehicle performs the same ASK demodulation to obtain the traffic information received, and, automatically transmits passive FMCW radar signals back to communicate with the host vehicle and accomplishes the full duplex inter-vehicle communication.

Each radar, forward or backward, comprises an inter-vehicle warning communication/detection dual mode modulation module, an inter-vehicle warning communication/detection dual mode demodulation module, and an inter-vehicle broadcast communication media access control (MAC) module.

The inter-vehicle warning communication/detection dual mode modulation module uses analog-digital hybrid modulation to synchronously perform dual functions of radar signal detecting as well as wireless communication. The communication model uses the amplitude shift keying for data modulation, which transmits digitized data with amplitude variations. The radar transmission/detection function, on the other hand, uses the frequency modulated continuous wave model, which detects/interprets data based on the frequency of the peak value signals within the known signal spectrum.

The inter-vehicle warning communication/detection dual mode demodulation module comprises a signal-filter, an FMCW radar demodulation unit, and an inter-vehicle communication demodulation module. The inter-vehicle communication demodulation module comprises an envelope detection unit, an auto-gain computation/update unit, and a data acquisition unit. Periodic tracking of the auto-gain control is performed to minimize the signal interference from the time-variant channel.

For the inter-vehicle broadcast communication media access control, the design of the inter-vehicle MAC procedure to achieve low interference for traffic safety event information transportation utilizes the existing broadcast feature to accomplish the enhanced efficiency for information transportation.

Based on simple structured automotive FMCW radar, the present invention accomplishes the purpose of an inter-vehicle communication and warning apparatus for traffic transportation safety enhancement. While applied in vehicle operation safety, due to the emphases on the real-time signal receiving and processing, the present invention requires very little data for signal transformation. As a result, the present invention can easily take the advantage of the 3 Mbps broadband wireless technology for efficient communication. Since the available data is limited to a short-range area, the warning information delivery is broadcast oriented. Since the short-range detecting sensitivity is high enough for the present invention, there is no need to use synchronization mechanism, this thus contributes to a low cost resulting system.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 7 illustrates the comparison of the present invention and a conventional spread spectrum radar.

DETAILED DESCRIPTION OF THE PREFERRED EMBODIMENTS

Figure 1:
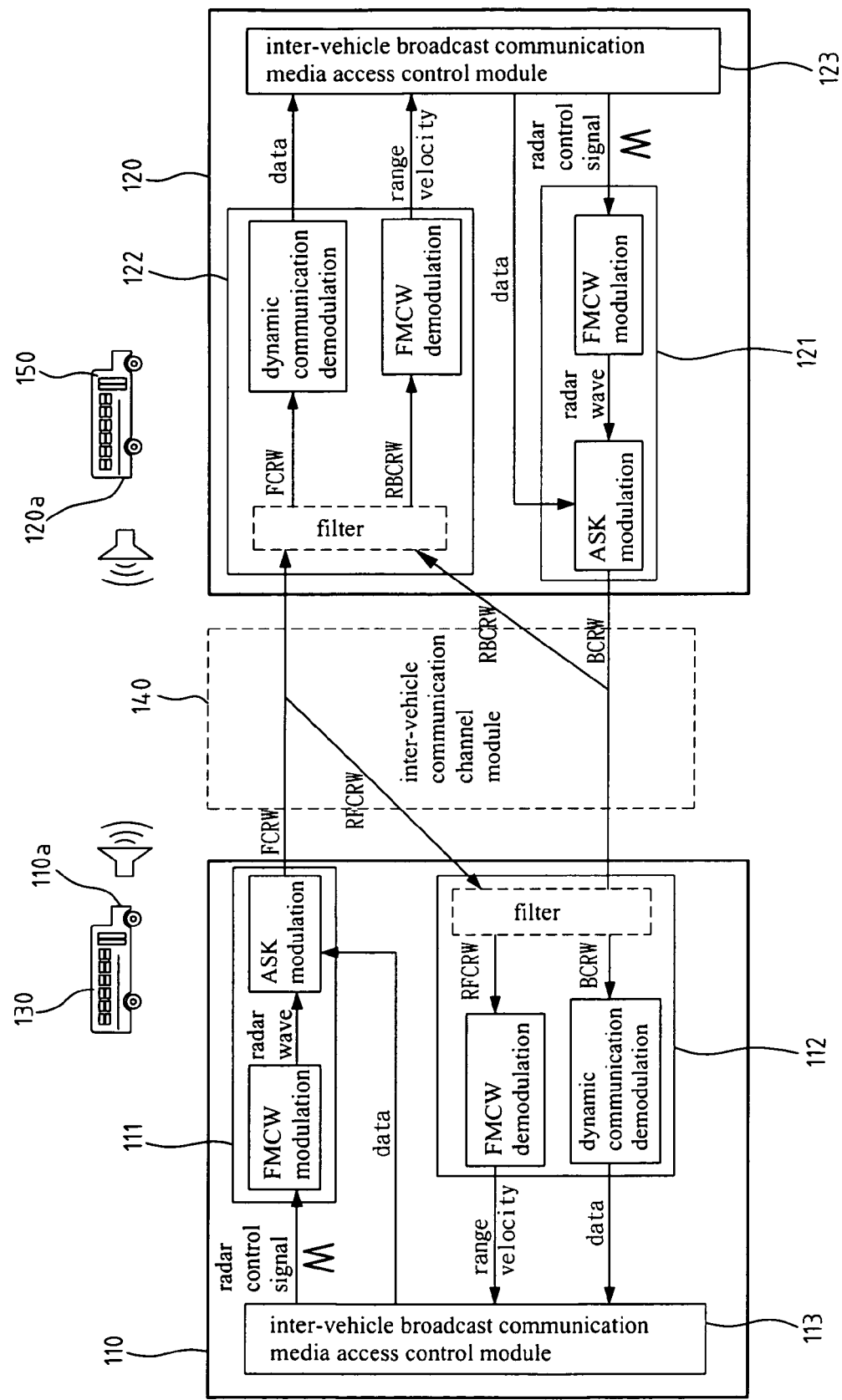
FIG. 1 shows a block diagram of an inter-vehicle communication and warning apparatus according to the present invention.

FIG. 1 shows a block diagram of an inter-vehicle communication and warning apparatus according to the present invention. Referring to FIG. 1, the apparatus 100 comprises a forward radar 110, and a backward radar 120, both of them can be installed at different spots on a vehicle, such as top, front, rear, etc. Without losing generality, in FIG. 1, the radars are installed at the front end 110a and the rear end 120a of the vehicle for ease of illustration. With an amplitude shift keying for data modulation, the forward radar 110 transmits forward communication radar waves FCRW toward the preceding vehicle 150. With the reflected FCRW, referred to RFCRW, from the preceding vehicle 150 back into the forward radar 110 of the host vehicle 130, the relative distance and velocity of the host vehicle 130, with respect to preceding vehicle 150, are calculated.

On the other hand, the forward communication radar waves FCRW, via an inter-vehicle communication channel 140, are received by the backward radar 120 of the preceding vehicle 150. Through ASK demodulation process, the backward radar 120 of the preceding vehicle 150 obtains the traffic information received, and automatically transmits a backward communication radar wave BCRW to communicate with the host vehicle 130. The reflected BCRW, referred to RBCRW, from the host vehicle 130 then transmits back into the backward radar 120 of the preceding vehicle 150, and completes the full duplex for the inter-vehicle communication.

A radar, forward or backward, comprises an inter-vehicle warning communication/detection dual mode modulation module, an inter-vehicle warning communication/detection dual mode demodulation module, and an inter-vehicle broadcast communication media access control module, which are labeled with 111/121, 112/122, and 113/123, respectively. The following describes the structure and operation of each module.

According to the present invention, the inter-vehicle warning communication/detection dual mode modulation module uses an analog-digital hybrid modulation to synchronously perform dual functions of radar signal detecting as well as the wireless communication. To avoid the interference between the radar modulation and the communication modulation within the same system, the communication model can use amplitude shift keying for data modulation, which uses the variations of amplitude of the sending signals to transmit digitized data. The radar transmission/detection model, on the other hand, can use the frequency modulated continuous wave, which detects/interprets data based on the frequency of the peak value signals within the known signal spectrum. When the FM signals are modulated via amplitude shift keying, the bandwidth becomes wider. Since the position of the peak value remains unchanged, the radar transmission/detection function is not affected.

The inter-vehicle warning communication/detection dual mode demodulation module comprises a signal-filer, a FMCW radar demodulation unit, and an inter-vehicle dynamic communication demodulation module.

Figure 2:
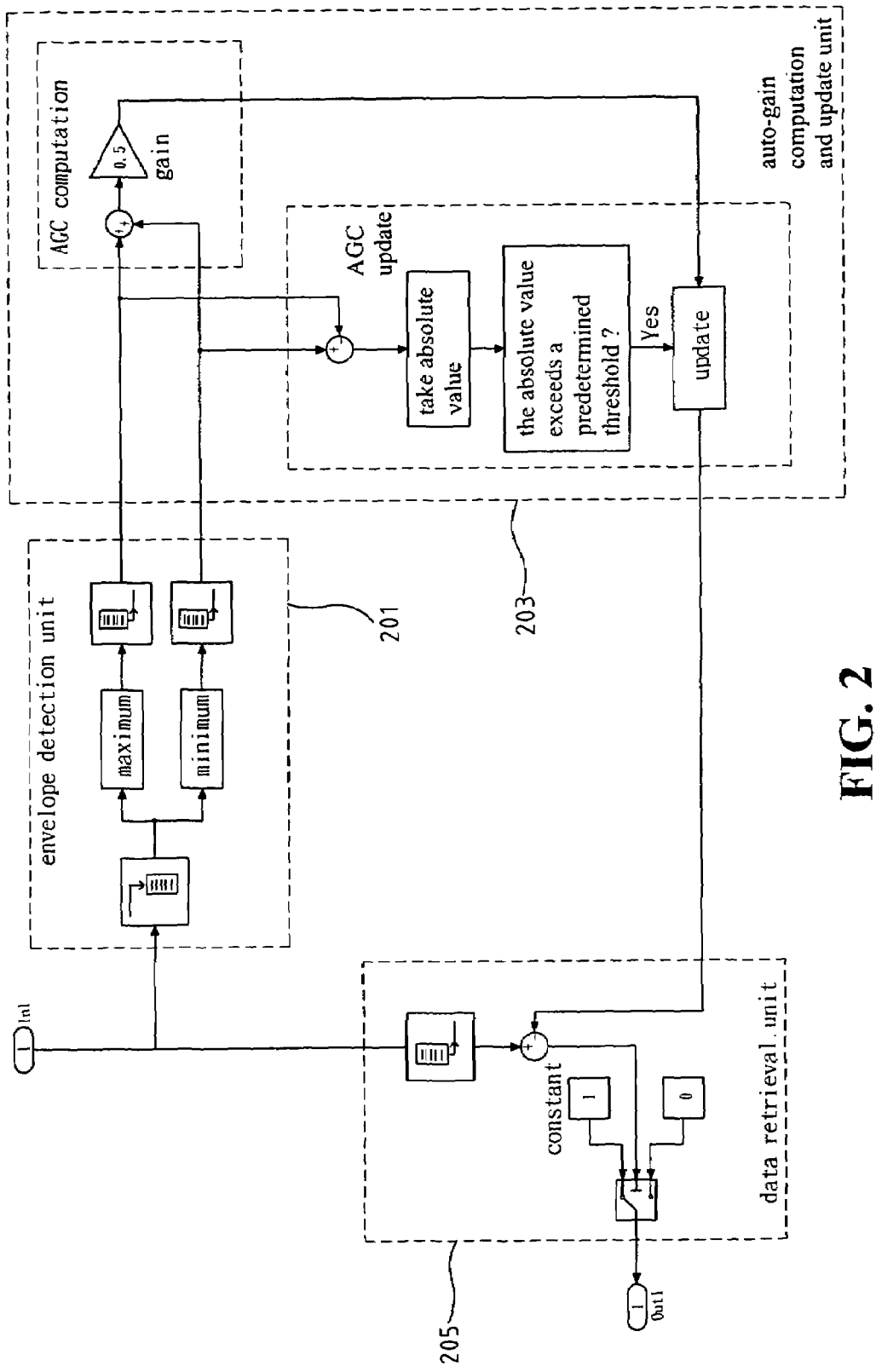
FIG. 2 illustrates the structure and operation of the inter-vehicle communication and warning demodulation module.

According to the present invention, the ASK modulation signals can use asynchronous envelope detection for demodulation. Since asynchronous envelope detection needs accurate detect of amplitude position base to determine the data unit output, the present invention emphasizes the design for the time variant channel feature for the inter-vehicle dynamic communication demodulation module, in order to enhance the data transmission efficiency. FIG. 2 illustrates the structure and operation of such inter-vehicle dynamic communication demodulation module.

Referring to FIG. 2, the inter-vehicle dynamic communication demodulation module includes an envelope detection unit 201, an auto-gain computation and update unit 203, and a data retrieval unit 205. Periodically, for instance every 100 μs, this module performs an auto-gain control tracking to minimize the interference from the time-variant channel.

Figure 3:
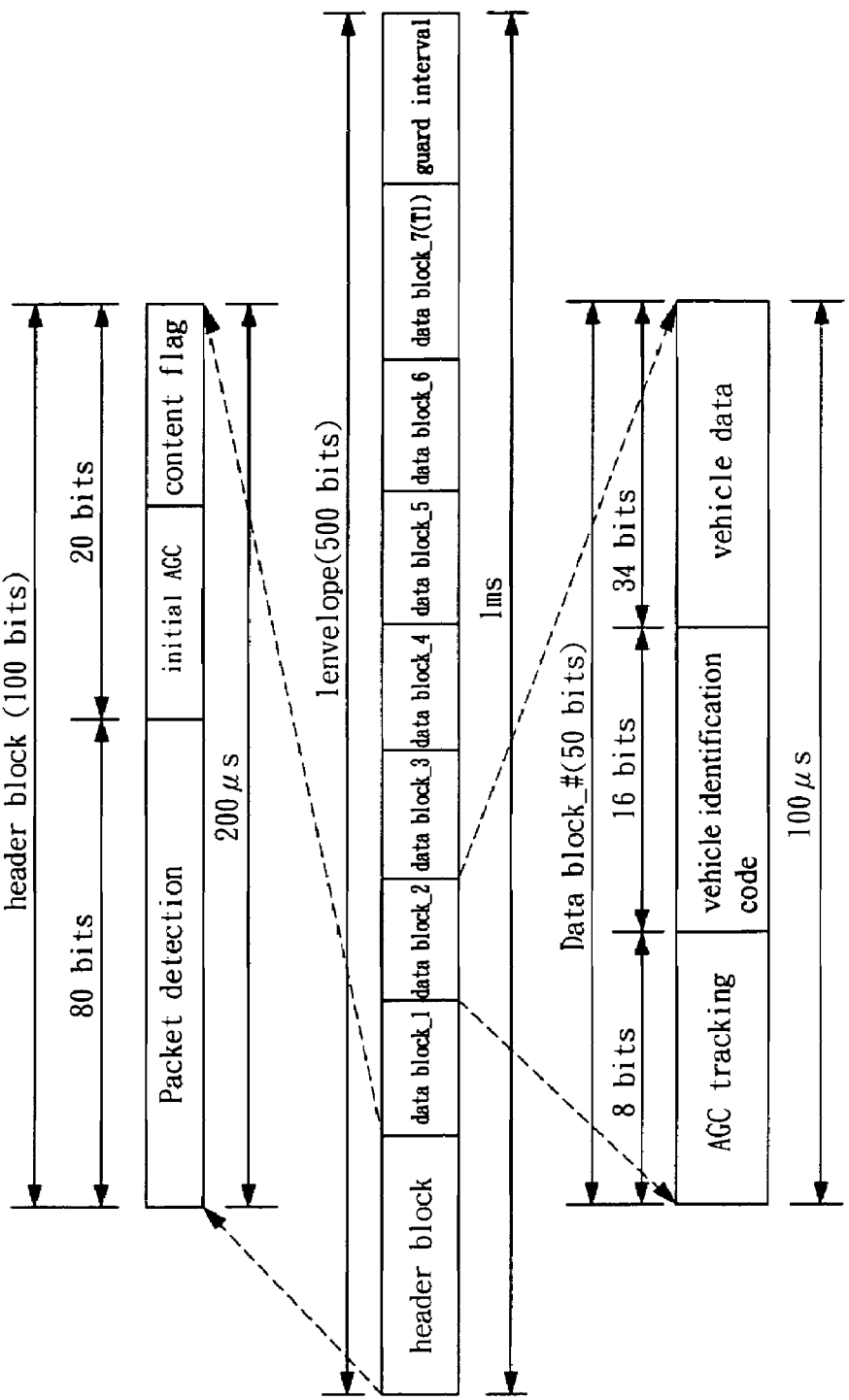
FIG. 3 shows an example of an envelope format for data transformation.

Before illustrating the structure and operation of the inter-vehicle dynamic demodulation module, FIG. 3 shows an example for illustrating the packet data format. Every packet comprises a header block (HB), a plurality of data blocks (DB), and one guard interval (GI). The header block (HB) comprises a plurality of preamble and one content flag. The preambles are used for packet detection and the initial auto-gain control (AGC). The content flag is used for marking the use/unused status of the data block in the current package.

Each data block comprises a set of three columns, which are used for an auto-gain control tracking, vehicle identification (ID) code, and vehicle data, respectively. Some data blocks are used for vehicle dynamics, which store the intended vehicle actions and current vehicle status.

Without losing generality, in this example, one package with 500 data units, comprising a header block with 100 data units, seven data blocks with 50 data units for each, and one guard interval. The header black includes five preambles, each with 16 data units, and one content flag with 20 data units.

Communication signals are generally everywhere. For example, transportations in the ocean, land, and air, all are conducting communication. Without losing generality, the present invention uses cars for demonstration.

In the example of package data format, the first to the sixth data block are used for vehicle dynamics. Since, within a short range, the probability of having duplicate license plate number is very low, it is sufficient to use four digits of the vehicle license plate number as vehicle identification to help drivers distinguish the dynamics for each vehicle. The vehicle related information is to inform drivers of the current status of the surrounding vehicles, which not only compensates the blind spots of the natural sensory but also helps drivers handle critical condition timely in case of an accident.

In addition to the data blocks for vehicle dynamics, there is another type of data block for general traffic information, which stores the real-time local traffic road condition to give early warning to drivers for timely safety actions. This should alleviate the traffic aggravation and also minimize the rate of accident. In the present illustration, the seventh data block is used for the general traffic information. The following uses the package data format described in FIG. 3 as an example to explain the operation of each unit in the auto-gain control module.

The envelope detection unit 201 uses one preamble in the header block, for example the fifth preamble, which is right before the data block, to perform the auto-gain control and detect the mean maximum and the mean minimum of this preamble. The calculation and update unit 203 for auto-gain control uses the mean maximum and the mean minimum to calculation the auto-gain and also starts adjusting the auto-gain under a predetermined condition. The data retrieval unit 205 determines the data unit output by comparing the updated auto-gain with the base frequency signal.

Taking an example of operating frequency of 60 GHz, and the relative vehicle velocity exceeds 3 miles per hour, according to the Doppler time-variant channel effect, vehicles under relative moving, the signal volume will change within one package time (in 1 ms). Under such circumstances, the auto-gain control tracking interval can be designed as every 100 μs to minimize the signal interference form the time-variant channel.

According to the present invention, the formula for calculating the signal-gain can be the average of the maximum and the minimum which are processed by the envelope detection unit. The time to start adjusting the auto-gain can be designed as when the difference between the maximum and the minimum exceeds a predetermined threshold, such as 0.1. There are varieties of methods for auto-gain calculation in terms of the hardware circuit execution. One of the options is to use an one-dimensional wire shift method, which advantages itself as a fast auto-gain control computation with simple hardware circuit structure.

Figure 4:
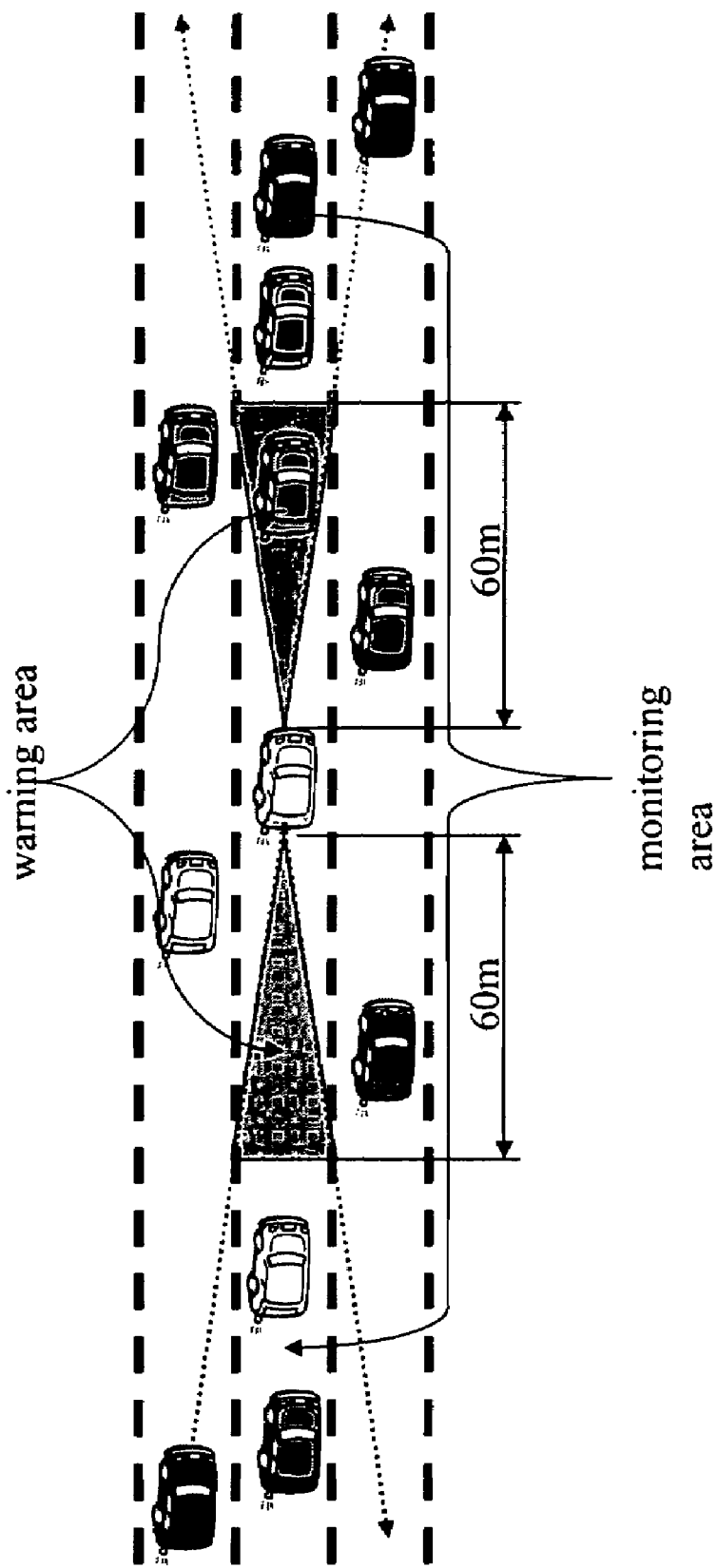
FIG. 4 shows an example of a communication model with a millimeter bandwidth.

FIG. 4 illustrates an example where the present invention is applied to the inter-vehicle communication model of millimeter wave band for the range within 300 meters. Referring to FIG. 4, since the millimeter wave for radar wave beam is at around 3 degrees, using the forward radar as an example, when the vehicle lane width is 3 meters, all radar signal band width within 60 meters would only cover the current vehicle lane. When the preceding vehicle is within the 60 meters warning area in the same lane, the communication can be regarded as a one-to-one vehicle communication model, in which the interference from the adjacent vehicle lanes can be ignored. If the preceding vehicle is in the monitoring area, which is out side of the 60 meters range, the radar signal transmission range is expanded to the adjacent vehicle lanes, and is considered a one-to-many inter-vehicle communication model, in which the interference signals from all adjacent vehicle lanes should be considered.

When two preceding vehicles have the same event, the following vehicles should only be warned of the occurrence of such one event. In this case, the same data position can be shared for the same event. Although two data transmission ends are sending the same data, it only magnifies the signal characteristics. When the signal characteristics is applied on the FMCW linear modulation, only simple data format and sliced symbol time are needed for achieving a low interference information transportation facility for traffic safety enhancement.

Figure 5:
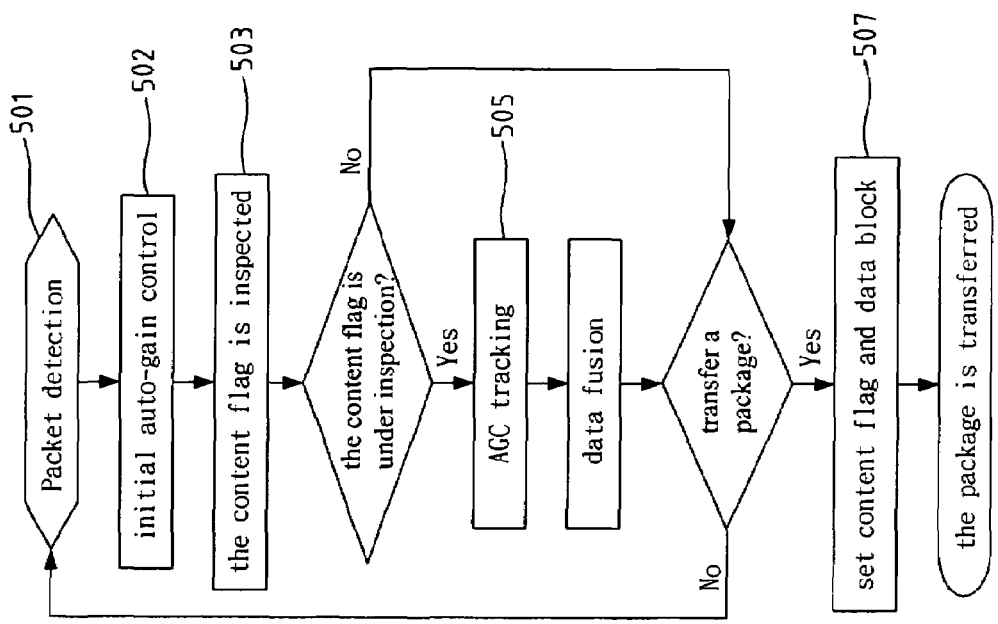
FIG. 5 shows the operation of the media access control module for an inter-vehicle broadcast communication according to the present invention.

To minimize the conflict rate of the packages transmitted by all related vehicles, the present invention utilizes the broadcasting feature of the traffic safety information, to achieve a low interference but high efficiency for a traffic safety information transmission system. FIG. 5 illustrates the operation of the media access control module of the inter-vehicle broadcast communication.

First of all, arrange a package data format for data transformation as shown in FIG. 3, and use the initial position of each data block for auto-gain tracking. Referring to the flowchart for the Media Access Control (MAC) shown in FIG. 5, each vehicle performs the packet detection right before sending out data, as labeled 501. Then executes the initial auto-gain control, as labeled 502. Then the content flag, as labeled 503, is inspected. By reviewing the current data block utilization between the package transmissions intervals, the decision is made for the package transmission time and data block position to be used for the maximal efficiency for data transformation. Right before the content flag gets instructed to review the current data block utilization, the auto-gain control tracking is triggered, as labeled 505, to minimize the signal interference from the time-variant channels. After the auto-gain tracking is done, the data is integrated, packaged and ready for transmission. Then the content flag is set and the data block is updated, as labeled 507.

Applying the present invention under the inter-vehicle communication environment of a short-range 60 GHz millimeter wave band with the computer simulation with the following setting: the channel model uses the one-to-one two patch Rician fading channel model, in which the fist path is the inter-vehicle linear wave, and the second path is the reflected wave from the ground. With the relative distance between the host vehicle and the preceding vehicle by 200 meter, the inter-vehicle linear wave is decayed to −3 dB, and the energy of the ground reflected wave is half of the inter-vehicle linear wave.

Figure 6:
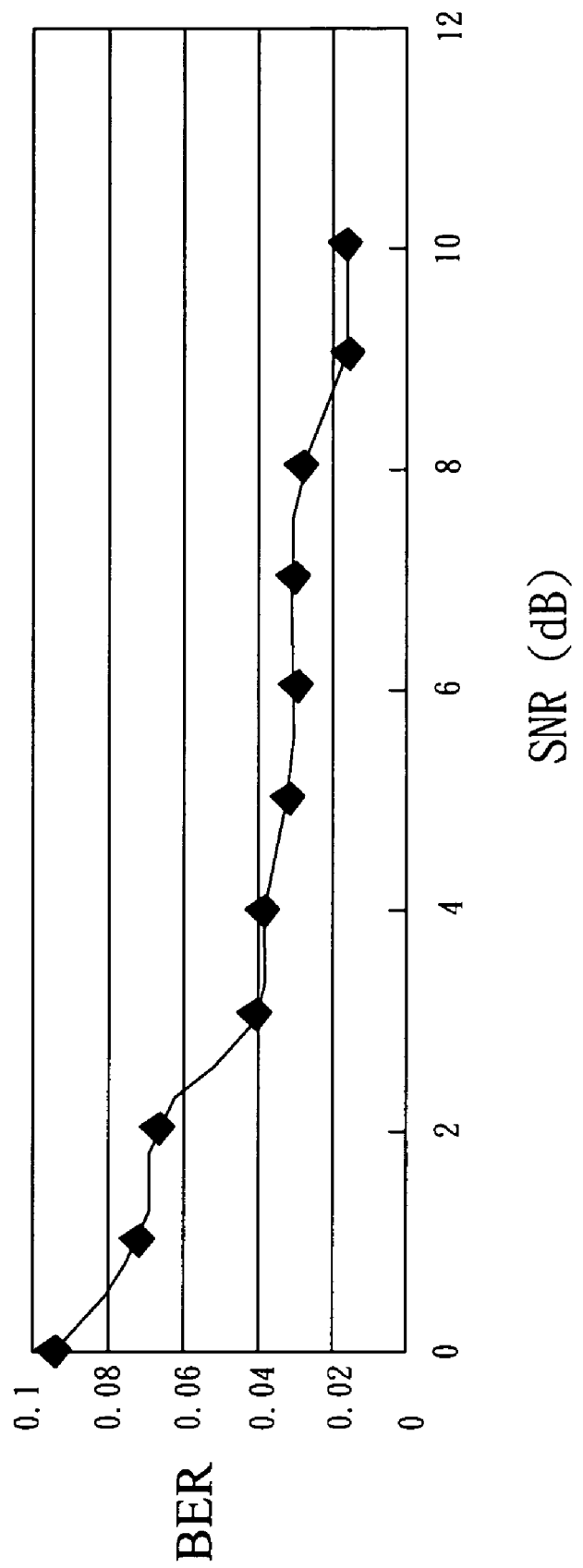
FIG. 6 shows the bit error rate versus the signal-to-noise ratio, from the simulation result, while the present invention is applied to a short-range inter-vehicle communication environment with millimeter bandwidth.

According to the aforementioned environmental setting and ran the simulation for 0.001 second, the measured simulation result shows, in FIG. 6, that when the signal-to-noise ratio (SNR) is greater than 9 dB, and the data transformation rate is 500 kbps, the bit error rate (BER) of the system data unit is lower than 0.02, which is 10 bits of errors per package. Since the data block has about 8 bits of errors according to the package content ratio, the equivalent error rate is 8 error messages per package. With the current package data format of transmitting 84 message per package, the error message rate per package is about 8/84=0.0952. With 5 repetitions per second for the same message, the message transformation error rate can be reduced to under 0.00001 per second. This implies that, for the use of the short-range inter-vehicle communication and warning function, the present invention can efficiently provide drivers with real-time and highly reliable warning information for automotive operation safety, and which is a significant contribution to general traffic safety improvement.

In additions, the present invention also has the following invoice features for the inter-vehicle sensing and detection functions: (a) direct inter-vehicle communication without the need for base stations or wireless beacons. (b) millimeter wave band has broader frequency band, and narrower wave beam, less multi-paths, high frequency band reuse rate. (c) Development of an analog-digital hybrid modulation technology to establish radar detection/communication dual mode system. (d) Combining inter-vehicle communication and networking technology to integrate the sensed/detected information amongst the host vehicle and the surrounding vehicles, and which helps make the best decision in the most efficient manner through the information sharing.

In conclusion, the inter-vehicle communication and warning apparatus of the present invention is mainly applied to the short-range detection/informing technology for vertical directional collision avoidance radar. The main purpose of the application is to detect the relative distance and velocity between the host vehicle and the preceding vehicle. In addition, to enhance the durability and reliability of the radar collision avoidance function, the present invention also grants the extra feature for the real-time traffic information exchanging between the host vehicle and the preceding vehicle within a limited range. The present invention thus enhances the radar collision avoidance by adding the two-way communication feature and accomplishes the dual functions for both data detection and communication.

FIG. 7 is the comparison between the present invention and conventional spread spectrum radar. From FIG. 6, these two dual model radar technologies all have the dual functions of radar distance detection and inter-vehicle communication. The conventional spread spectrum radar uses the spread spectrum radar modulation and the phase shift keying communication modulation, with spread spectrum code to detect synchronization. With spread spectrum, the resolution for sliced symbol unit is limited, and this makes the synchronization difficult and restricts the short-range sensitivity. The present invention, on the other hand, uses FMCW radar and the amplitude shift keying for data modulation and arranges a special package format, which performs the communication demodulation and the auto-gain control calculation/update based on the envelope detection technique. The present invention thus not only overcomes the synchronization difficulty but also provides a good quality of short-range sensitivity.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An inter-vehicle communication and warning apparatus including a forward radar and a backward radar, wherein a host vehicle and a preceding vehicle perform an inter-vehicle communication/detecting via the following model:

said forward radar on said host vehicle, with an amplitude shift keying (ASK) for data modulation, transmits forward continuous modulated waves FCRW toward said preceding vehicle, the reflected FCRW, referred to RFCRW from said preceding vehicle are back into said forward radar of said host vehicle, thereby the relative distance and velocity of said host vehicle with respective to said preceding vehicle being computed; and said FCRW are received by said backward radar of said preceding vehicle via an inter-vehicle radio communication channel, through said ASK demodulation, said backward radar of said preceding vehicle obtains the traffic information and transmits a backward continuous modulated wave BCRW to communicate with said host vehicle, and the reflected BCRW, referred to RBCRW, from said host vehicle then transmits back into said backward radar of said preceding vehicle, thereby completing the full duplex for said inter-vehicle communication and detection.

2. The inter-vehicle communication and warning apparatus as claimed in claim 1, wherein each said radar further comprises an inter-vehicle warning communication/detection dual mode modulation module, an inter-vehicle warning communication/detection dual mode demodulation module, and an inter-vehicle broadcast communication media access control (MAC) module.

3. The inter-vehicle communication and warning apparatus as claimed in claim 2, wherein said inter-vehicle warning communication/detection dual mode demodulation module comprises a signal-filter, a FMCW radar demodulation unit, and an inter-vehicle communication demodulation module.

4. The inter-vehicle communication and warning apparatus as claimed in claim 2, wherein said inter-vehicle communication demodulation module further comprises:

an envelope detection unit, which uses one of the preambles in the header block as the initial auto-gain control to detect the mean maximum and the mean minimum of said preamble, and said envelope detection unit also uses the auto-gain control column in each data block to track the auto-gain;

an auto-gain computation and update unit, which uses the mean maximum and the mean minimum to calculate the signal-gain and adjust the signal-gain under a predetermined condition; and a data retrieval unit, with the updated signal-gain compared with the base frequency signal to decide data unit output.

5. The inter-vehicle communication and warning apparatus as claimed in claim 4, wherein said signal gain is calculated by the mean of said maximum and said minimum.

6. The inter-vehicle communication and warning apparatus as claimed in claim 4, wherein said time for adjusting said signal gain is when the absolute value of the difference between said maximum and said minimum exceeds a predetermined threshold.

7. The inter-vehicle communication and warning apparatus as claimed in claim 4, wherein said signal gain computation is performed with a one-dimensional wire shift method.

8. The inter-vehicle communication and warning apparatus as claimed in claim 2, wherein said inter-vehicle broadcast communication MAC module performs the following functions:

performing a packet detection before said vehicle transmits data;

performing said initial auto-gain control;

inspecting said content flag and, according to the current receiving packet transmission time and data block utilization, deciding the next packet transmission time as well as the data block utilization location; and performing said auto-gain tracking before said content flag indicates receiving a corresponding data block.

9. The inter-vehicle communication and warning apparatus as claimed in claim 2, wherein said inter-vehicle warning communication/detection dual mode modulation module uses an analog-digital hybrid modulation to synchronously perform dual functions of radar signal detecting as well as the wireless communication.

10. The inter-vehicle communication and warning apparatus as claimed in claim 1, wherein said apparatus arranges a special package format to realize said inter-vehicle communication and detection, and each said package comprises:

a header block, which includes a plurality of preambles and a content flag;

a plurality of data blocks, wherein each data block consists of three columns of data, which includes an auto-gain control, a vehicle identification code, and a vehicle data, respectively; and a guard interval;

wherein said preambles are used for envelop detection and initial auto-gain control; said content flag is used for labeling the usage of each said data block within said package.

11. The inter-vehicle communication and warning apparatus as claimed in claim 10, wherein said a plurality of data blocks are categorized as vehicle dynamic information blocks and traffic information blocks, each said vehicle dynamic information block stores intended vehicle actions and current vehicle status, and each traffic information block stores the real-time localized environmental traffic condition.

12. The inter-vehicle communication and warning apparatus as claimed in claim 10, wherein said apparatus is applied to a one-to-one inter-vehicle channel model.

13. The inter-vehicle communication and warning apparatus as claimed in claim 10, wherein said apparatus is applied to a one-to-many inter-vehicle channel model.

14. The inter-vehicle communication and warning apparatus as claimed in claim 1, wherein said communication model uses said amplitude shift keying for data modulation, and transmits digitized data with amplitude variations.

15. The inter-vehicle communication and warning apparatus as claimed in claim 1, wherein said forward radar and said backward radar are equipped on the front end and the rear end, respectively, of said vehicle.

* * * * *